US012632646B2

(12) United States Patent　　　　(10) Patent No.:　US 12,632,646 B2
Matic et al.　　　　　　　　　　　 (45) Date of Patent:　　　May 19, 2026

(54) SERVICE MANAGEMENT SYSTEM HAVING A FORM-CREATION INTERFACE INCLUDING FIELD SORTING AND SELECTION FUNCTIONALITY

(71) Applicant: Atlassian Pty Ltd., Sydney (AU)

(72) Inventors: Marko Matic, New Castle (AU); Jehan Gonsal, Sydney (AU); Benjamin Wong, Sydney (AU); Christopher Owen, Sydney (AU); Vanessa De Coninck, Melbourne (AU); Brona O'Connor, Sydney (AU); Nhat Tran, Sydney (AU); Edward Zhang, Sydney (AU); Karol Tarasiuk, Sydney (AU)

(73) Assignee: ATLASSIAN PTY LTD., Sydney (AU)

( * ) Notice: Subject to any disclaimer, the term of this patent is extended or adjusted under 35 U.S.C. 154(b) by 174 days.

(21) Appl. No.: 18/374,610

(22) Filed: Sep. 28, 2023

(65) Prior Publication Data

US 2025/0111136 A1 　　Apr. 3, 2025

(51) Int. Cl.
G06F 3/0486　　　(2013.01)
G06F 40/186　　　(2020.01)
G06Q 10/0633　　 (2023.01)

(52) U.S. Cl.
CPC .......... G06F 40/186 (2020.01); G06F 3/0486 (2013.01); G06Q 10/0633 (2013.01)

(58) Field of Classification Search
CPC .... G06F 40/186; G06F 40/174; G06F 3/0486; G06F 3/0482; G06F 3/048; G06Q 10/0633; G06Q 30/016
See application file for complete search history.

(56) References Cited

U.S. PATENT DOCUMENTS

| 2019/0004773 | A1* | 1/2019 | Hoberman | .............. | G06F 16/22 |
| 2019/0065455 | A1* | 2/2019 | Dua | ...................... | G06F 40/143 |
| 2022/0012236 | A1* | 1/2022 | Harrison | ................ | G06N 20/20 |

* cited by examiner

*Primary Examiner* — Jeanette J Parker
(74) *Attorney, Agent, or Firm* — Brownstein Hyatt Farber Schreck, LLP

(57) ABSTRACT
A service management system may include an intake interface builder interface, which allows administrators to create and edit intake interfaces for use in a help desk. Through that interface, the administrator may also create and edit field elements to be displayed and used as input items in an issue tracking platform. The intake interface builder may include a field region, which displays retrieved fields selected and sorted in accordance to a criteria. For example, the criteria may be based on user logs, semantic similarity, relatedness to other selected fields, and the like. This selection and sorting of fields allows administrators to quickly find and create intake interfaces.

6 Claims, 14 Drawing Sheets

200

208

202

204

206b     206a

210

204a

204b

HELP DESK
PORTAL

204c

204d

ISSUE
TRACKING
PORTAL

206c

206d

202

206a

502a

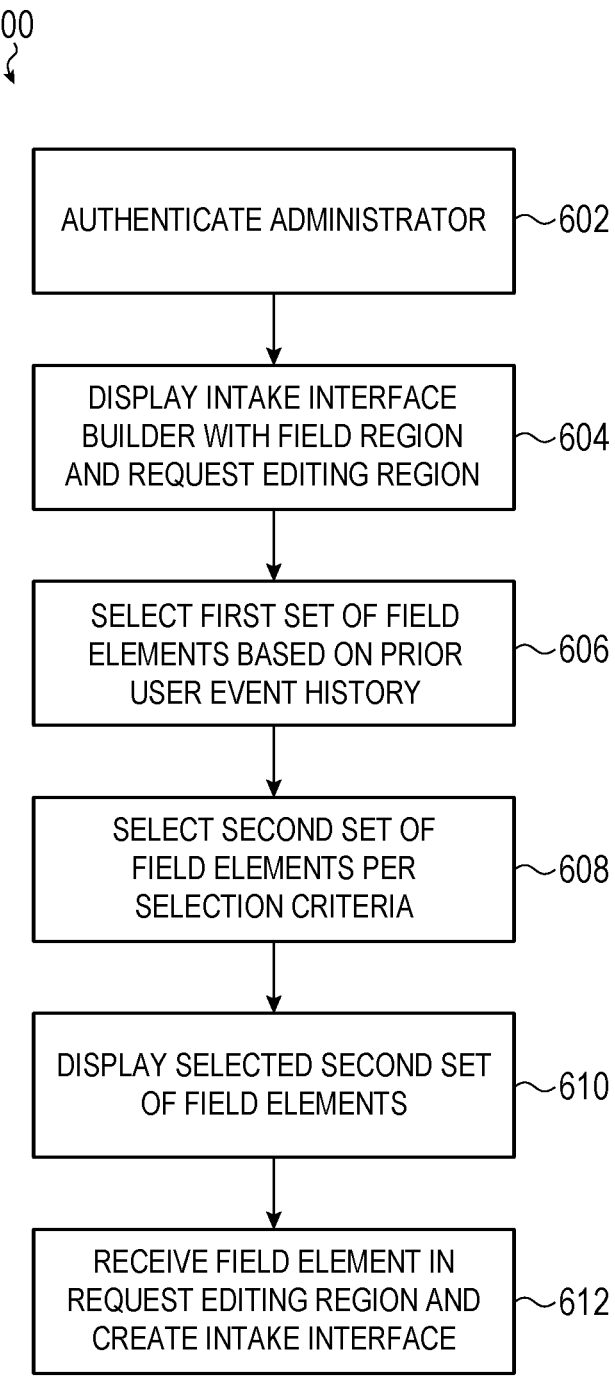

600

AUTHENTICATE ADMINISTRATOR ~602

DISPLAY INTAKE INTERFACE BUILDER WITH FIELD REGION AND REQUEST EDITING REGION ~604

SELECT FIRST SET OF FIELD ELEMENTS BASED ON PRIOR USER EVENT HISTORY ~606

SELECT SECOND SET OF FIELD ELEMENTS PER SELECTION CRITERIA ~608

DISPLAY SELECTED SECOND SET OF FIELD ELEMENTS ~610

RECEIVE FIELD ELEMENT IN REQUEST EDITING REGION AND CREATE INTAKE INTERFACE ~612

*FIG. 6*

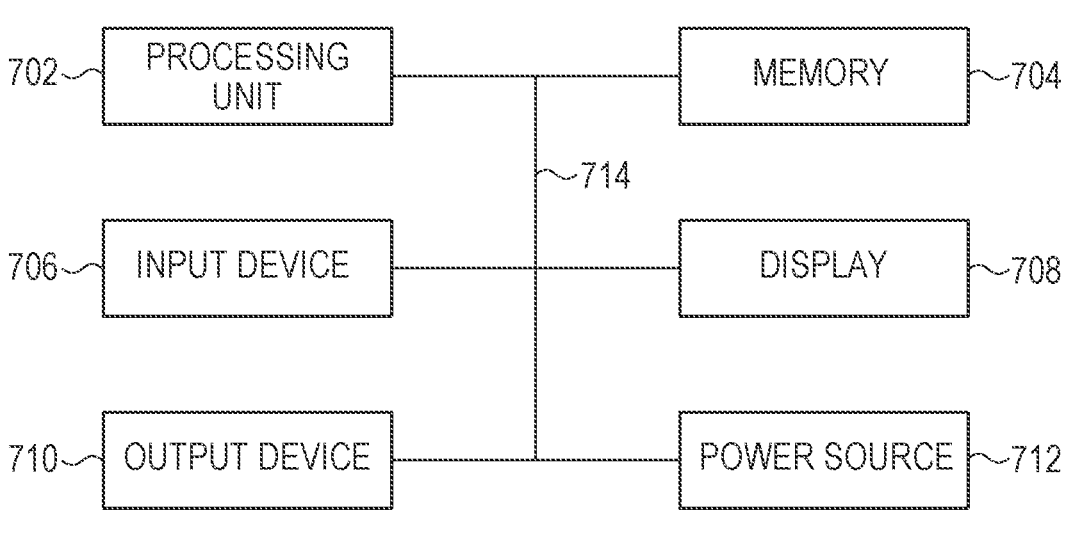
FIG. 7

SERVICE MANAGEMENT SYSTEM HAVING A FORM-CREATION INTERFACE INCLUDING FIELD SORTING AND SELECTION FUNCTIONALITY

TECHNICAL FIELD

Embodiments described herein relate to service management systems and, in particular, to form builders within service management systems.

BACKGROUND

Help desks and issue tracking systems may allow enterprises to organize and manage their workflows, such as for information technology applications. However, one challenge with traditional issue tracking systems is providing an efficient user interface that collects the right amount of information from the user in order to ensure prompt resolution of the technical issue. Some traditional systems request too much information for some tasks and too little information for other tasks. The systems and techniques described herein can be used to quickly tailor an intake interface using an administrator tool that can be used to more easily generate new or modified intake flows for an electronic help desk.

SUMMARY

Embodiments described herein may be directed to systems and methods for automatically selecting and sorting fields in a service management system. An administrator may create and edit intake interfaces in a help desk platform and may create and edit issue item fields related to the issue intake interface. In some cases, in accordance with an authenticated user account having administrator access with respect to the service management system, an intake interface builder graphical user interface may be displayed. The intake interface builder graphical user interface may include a field region configured to display a plurality of field elements and a request editing region configured to receive field elements from the field region in response to a drag-and-drop user input. In some examples, the request editing region may include user input regions of an issue intake interface of a help desk platform. Next, a first subset of field elements of a plurality of field items may be selected. The selection of the first subset of field elements may be based on prior user event history with respect to the service management system. A second subset of field elements from the first subset of field elements satisfying a selection criteria may then be selected. The selection criteria may be based on, at least in part, field element selections performed by the authenticated user account within a predetermined time period. At the intake interface builder graphical user interface, the selected second subset of field elements may be displayed and in response to receiving a first user input of a first field element of the second subset of field elements, the first field element within the request editing region may be displayed while display of the first field element within the field region may be suppressed. In some embodiments, in response to receiving a second user input comprising a confirming creation of the intake interface input, an issue intake interface may be generated. The issue intake interface may include an input field corresponding to the first field element when displayed by the help desk platform.

According to some examples, the user account may be a first user account. In some cases, in accordance with an authenticated second user account having customer access with respect to the service management system, the issue intake interface may be displayed. In response to receiving, at the issue intake interface, a customer input to create a new issue item: a first window having a form comprising an intake interface input field may be displayed and in response to a user selection of the issue intake interface from the intake interface input field, a set of user input fields including the input field corresponding to the first field element may be retrieved and the input field may be automatically configured in accordance to a format. In some examples, in accordance with receiving a second customer input to at least one user input field of the set of user input fields, an issue item at an issue tracking system may be generated.

Embodiments described herein may include a method for suggesting field elements in an intake interface builder of a service management system. In some cases, subsequent to authenticating a user account having administrator access to the service management system, an intake interface may be accessed via an intake interface builder graphical user interface. In some cases, the intake interface builder graphical user interface includes a field region configured to display a plurality of selectable field elements and a request editing region configured to receive at least one selectable field element from the plurality of selectable field elements in response to a user input. The request editing region may define user input regions of an issue intake interface of a help desk platform. A set of selectable field elements of the plurality of selectable field elements may be selected and sorted. The selecting and sorting may include: for a first subset of selectable field elements, applying a weighing metric to each respective selectable field element, the weighing metric based, at least in part, on a frequency of use of the respective selectable field element and a time period of use of the respective selectable field element; and selecting a second subset of selectable field elements from the first subset of selectable field elements based on the weighing metric and a selection criteria. In some examples, the second subset of selectable field elements may be displayed at a top region of the field region. In response to receiving a first user input of a first field element of the second subset of field elements, the first field element may be displayed within the request editing region and display of the first field element within the field region may be suppressed. In response to receiving a second user input comprising a confirming creation of the intake interface, an issue intake interface may be generated which includes an input field corresponding to the first field element when displayed by the help desk platform.

Embodiments described herein include a method for displaying field elements in an intake interface builder graphical user interface. As described, the method may include: Subsequent to authenticating a user account having administrator access to a service management system, accessing an intake interface via an intake interface builder graphical user interface. In some cases, the intake interface builder graphical user interface may include a field region configured to display a plurality of field elements, each field element of the plurality of field elements may be configured to be dragged from the field region to a request editing region, each field element of the plurality of field elements may include a graphical representation of field items available in the service management system and request editing region which may be configured to receive at least one field element from the plurality of field elements in response to a user input. The request editing region may define user input regions of an issue intake interface of a help desk platform.

The method may further include selecting a subset of field items from a set of field items that satisfy a selection criteria, the selection criteria may be based on each field item used within a predetermined period of time with respect to the service management system. The selected subset of field items may then be sorted according to a sorting criteria based on a date used for each field item and a predicted relevance with respect to the user account. The sorted subset of field items may be displayed as a first subset of field elements within the field region. In some cases, in response to receiving a first user input including a first field element of the first subset of field elements, the first field element may be displayed within the request editing region and the first field element may be suppressed from display in the field region. In response to receiving a second user input configuring creation of the intake interface, an issue intake interface may be generated that includes an input field corresponding to the first field element when displayed by a help desk platform. In response to the user selecting the intake interface within the help desk platform, the issue intake interface may be automatically displayed and the input field may be automatically configured according to a format. In some cases, in response to a customer confirmation, the issue item including the user input within the input field may be created.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

FIG. 6 depicts an example method for creating intake interfaces in a service management system, such as described herein.

FIG. 7 depicts an example hardware for devices of the systems described herein.

The use of the same or similar reference numerals in different figures indicates similar, related, or identical items.

Figure 1:
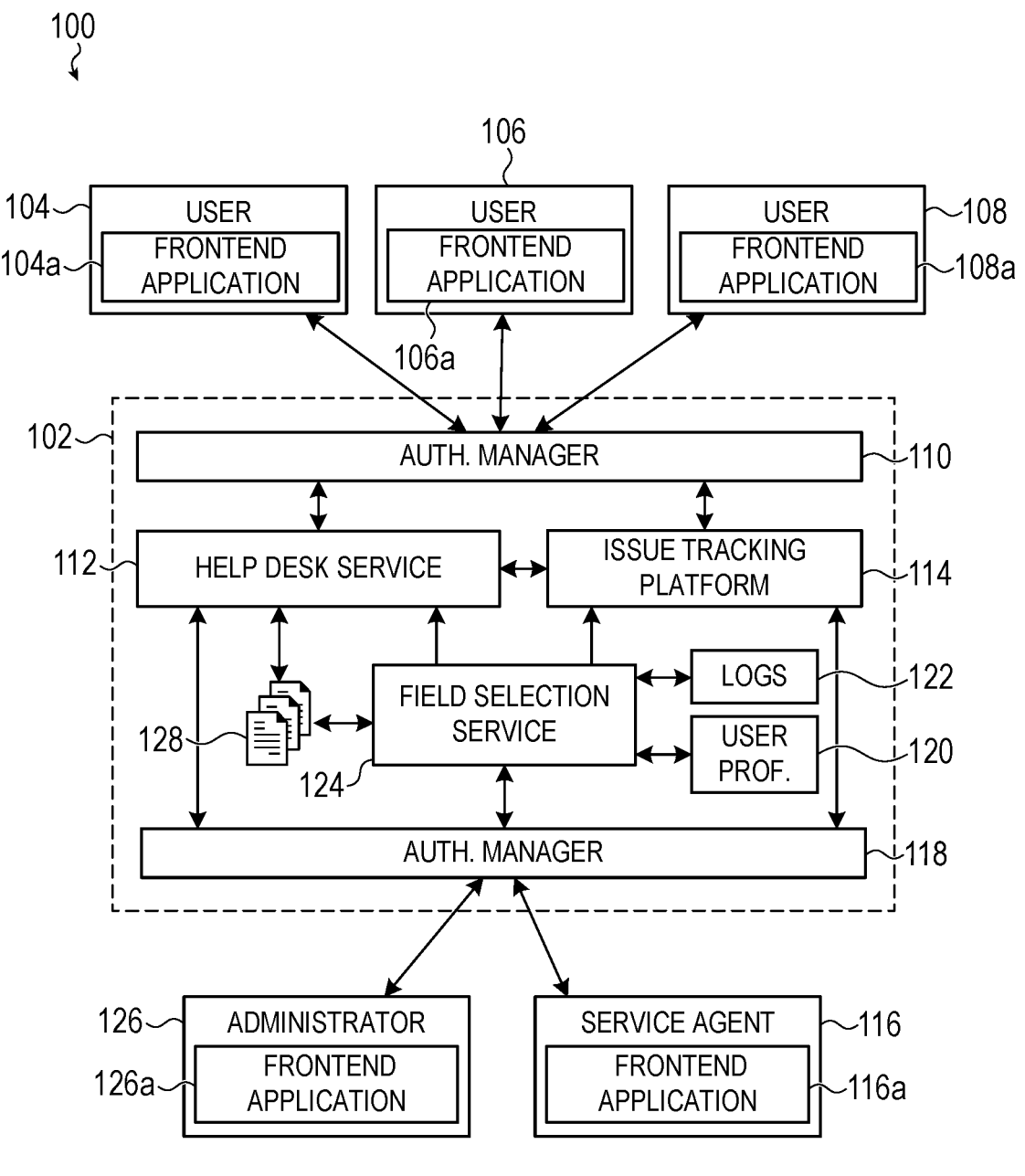
FIG. 1 depicts a system diagram of a service management system configured to select and sort fields, such as described herein.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein. Accordingly, they may not necessarily be presented or illustrated to scale and are not intended to indicate any preference or requirement for an illustrated embodiment to the exclusion of embodiments described with reference thereto.

DETAILED DESCRIPTION

Embodiments described herein relate to systems and methods for displaying field item recommendations. In particular, the systems and methods described here recommend and sort field items in an intake interface builder of a service management system. These field items may be displayed as field elements in the intake interface builder, which creates intake interface forms, also referred to as intake interfaces. Upon creating the intake interfaces, the intake interfaces become available in a help desk portal and define the interface within the help desk portal and can be used to define the interface and fields of issues tracked by an issue tracking platform once the issue is created.

IT and enterprise service management systems are effective tools for managing, supporting, controlling, and delivering services. These service management systems may include a series of applications which support different functions of the service. For example, a help desk application may allow users or service agents to report an issue within an enterprise. An issue tracking platform may manage those issue items, assign issues to service agents to resolve, allow viewers to view the status of their issue items, and the like. In many of the above applications, each issue item and each intake interface includes a series of fields which allow users and agents to collect information for routing and resolving issues. Fields also allow systems to create a knowledge base that streamlines future work. In some cases, fields can be searched and filtered to quickly retrieve relevant items.

However, as the size of an organization grows and as the needs of each team and/or project changes, new fields may need to be created to capture specific information or to adapt to new issues of the larger organization. For example, a team working in hardware development may create a field for hardware service life. A team working on software for a game may include a field for known glitches and/or chapter of the game where a glitch was found. As new fields are developed, it may be increasingly difficult for administrators to find existing fields that meet their project needs. In many cases, each project has a new set of issue items, and corresponding fields which are custom built to support the project. Thus, as new projects are created and administrators start building request forms to support those projects, the administrators have to remember and search for each of those fields they wish to use. Generally, these searches are traditional keyword searching, which may yield limited results and which may not account for related items outside the searched keyword. Alternatively, an administrator may not immediately find a field to appropriately capture the needs for the intake interface and may elect to create a custom field. However, in some cases, creating custom fields may result in duplicates of existing fields created by other projects and/or by other administrators. This duplication consumes database space and, more importantly, makes it more difficult to harmonize fields within a knowledge base to extract valuable insights. For example, fields may include "DESCRIPTION." "ISSUE." "SUMMARY." "NARRA-TIVE." "EXPLANATION," and the like, and they may be designed to capture the same things. However, due to the challenges of quickly finding the appropriate fields, an administrator may create a "PROBLEM DESCRIPTION" field when other fields were available. As a result of this interface, it may become time-consuming for administrators to create intake interfaces.

The systems and methods described herein relate to a service management system that automatically selects and sorts field items in an intake interface builder. The intake interface builder described herein may include a field region and a request editing region. The field region may include sorted field elements which are graphical representations of field items. Using the example interface, the field elements may be user selectable and may be dragged-and-dropped to the request editing region to quickly and efficiently build intake interfaces. In many cases, the field elements presented within the field region have been selected and sorted in accordance with a selection criteria.

In some embodiments, the selection criteria may be based on use history of the fields with respect to an enterprise, use history of the fields with respect to a project or type of project, and/or use history of the fields with respect to a particular user. In some cases, the use history reflects the use of the fields by users of the help desk or fields that are not null or contain values once the issues are created in the issue tracking system The intake interface builder may be configured to receive or track data that is based on user event logs generated through prior use of the service management system. Example user event logs may include a user's log history in a help desk, history of issues created in an issue tracking system, or user interactions in the same intake interface builder interface. In some cases, the user event logs (and thereby the recently used criteria) may be based both of the user's history as well as other users' history which may be associated with the user. For example, the group of users may be associated with the same project or same department. In some cases, the field elements are further sorted by a timestamp or date stamp so that the most recent fields used are on the top of the field region. In some cases, the field elements selected (e.g., based on the user event logs) may be further based on other criteria, such as alphabetical, field type, most popular, and the like.

In some cases, the selection criteria may be based on a semantic analysis of, at least, user input within the request editing region, such as title of the intake interface, description of the intake interface, and the like. A backend application may retrieve other existing intake interfaces (e.g., from the same project, from other projects, from the same department) which are semantically similar to the user input. Based on these retrieved intake interfaces, the backend application may extract the field items and display them as field elements. In some cases, the extracted field items may be further selected to display only field elements which have been used by the user or field elements that have been used at least a threshold number of times.

In other embodiments, the selection criteria may be based on a relationship of already-selected field elements in the request editing region. For example, a user selection of a field element (e.g., "HARDWARE ISSUE") may be commonly used with "EMPLOYEE ID," "HARDWARE TYPE," and "WARNING SCREENSHOT." Accordingly, the backend application may select those items commonly used together and display them as field elements in the field region. In other cases, the selection criteria may be based on project, user favorites, field types, and the like.

In other embodiments, the selection criteria is further refined by context data of the current session. For example, the selection criteria may be based on a project type of the current intake interface being currently defined. The selection criteria may also be based on recently created or recently modified project types and other activity performed in a current session or in a recent session with respect to the system. The selection criteria may also be based on a role, job description, or other attribute of the authenticated user. User attributes may be determined by obtaining a user profile for the authenticated user or by accessing other user-specific data on the system. In some cases, the selection criteria may include information obtained from other applications of the service management system accessed in the current session.

Regardless of the selection criteria, a user may quickly see the field elements within the field region and select them to be included in a request editing region. Upon user confirmation, an intake interface may be created that includes the selected field elements within the request editing region. In the same interface, a user may also change how the issue item is shown in the issue tracking system (e.g., via an "ISSUE VIEW" tab). At this interface, the field elements may be shown according to the same criteria as was used in the intake interface builder view. In some cases, the field elements may include other tags which indicate to the user that a particular field element has already been selected in the intake interface builder view. Thus, a user can quickly control what the request and the issue associated with that request includes (in terms of field items) within a single user interface. Moreover, the user may also view and edit the workflow. In some embodiments, upon including a field in the intake interface (e.g., a hidden field where the request is marked as "URGENT"), the workflow may change, allowing all issue items created under that intake interfaces to be treated under an expedited workflow.

These foregoing and other embodiments are discussed below with reference to FIGS. 1-7. However, those skilled in the art will readily appreciate that the detailed description given herein with respect to these figures is for explanation only and should not be construed as limiting.

FIG. 1 shows an example simplified system diagram 100 including the service management system 102 described herein. The system 100 is depicted as implemented in a client-service architecture; however, other implementations and communications architectures are possible. The system 100 may include a set of host servers, which may be one or more virtual or physical computing resources (e.g., as a cloud platform). More generally, the service management system 102 can be the infrastructure and services through which IT and/or enterprise service management services are provided.

The service management system 102 may be communicatively coupled to one or more client devices from users 104, 106, and/or 108, which may be any suitable electronic device. Each client device from users 104-108 may be associated with a different user. The client device from users 104, 106, 108 may each be operable to instantiate instances of a frontend application 104a, 106a, 108a on their device. These frontend applications may be of any of the platforms and/or services of the service management system 102.

As discussed above, the service management system 102 can support infrastructure for one or more backend applications, each of which may be associated with different software platforms that are part of or support the service management system 102. Users 104, 106, 108 may access applications or services of the service management system 102 via an authentication manager 110. The authentication manager 110 may be a single centralized that can provide authentication as a service to each request before it is forwarded to other platforms or services. In some cases, the authentication manager 110 may be authentication instances which are platform- or service-specific. More generally, the authentication manager 110 authenticates users (e.g., from client devices from users 104-108) based on, for example, user credentials. In this example, the authentication manager 110 may receive usernames, passwords, pins, passphrases, biometric data, or other user-identifying information. The user authentication data may be stored and/or tracked using tokens, cookies, or other data elements. Upon successful authentication by the authentication manager 110, the user may access the platforms and/or services of the service management system 102, such as a help desk service 112 and the Issue Tracking Platform 114.

In the current example, the service management system 102 presents multiple different interfaces depending on the level of access and role of a particular authenticated user: a first interface provided by the help desk service 112 providing a issue reporting interface, a second interface provided by the form builder 128 (e.g., leveraging the field selection service 124), which allows administrators to design, configure, and modify the issue reporting interface, and a third interface provided to an issue tracking platform 114, which allows users to process and monitor issues or tickets initiated by the help desk service 112.

In the example of an information technology environment, the help desk service 112 may refer to an interface that can be used to collect information about a user's technical issue and create a ticket that is processed by an issue tracking platform. The help desk service 112 may be operable to accept, classify, and define technical issues provided by users accessing a portal or interface provided by frontend applications 104, 106a, 108a operating on the client devices 104, 106, 108. In some cases the users operating the frontend applications 104, 106a, 108a are authenticated users. In some cases, the users are anonymous or manually enter identifying information through the help desk service 112. In some cases, the help desk service 112 may also provide a knowledge base and reporting services. In some examples, the help desk service 112 may also include community forums where users can ask and answer questions from other users in the community. An example of a help desk service 112 interface is shown in FIGS. 3A-3C, and a workflow is included in FIG. 2A. More generally, the help desk service 112 is the starting point for documenting issues and organizing them according to enterprise policies.

The help desk service 112 may be configured in any number of ways that allows the user to report issues, look for help regarding issues, and the like. In some embodiments, the help desk service 112 may include department-specific or project-specific selections that help route the issue and resolve those issues in a streamlined fashion. In some cases, each department, project, or the like may be associated with different intake interfaces. As described herein, intake interfaces may refer to a series of screens and/or interface forms presented in accordance with a project defined by the form builder 128. These screens are presented to users in a help desk interface. Each intake interface may be tailored to each department, project, or the like to best capture useful information to resolve the issue. As explained above, information is captured via input items (representing fields) contained in each intake interface. The input items may include required and optional information. While hundreds if not thousands of field items may be available for different issues, displaying a limited number of fields as input items is important to avoid overwhelming users, to streamline issue creation, and to cabin the type of information used in the different requests.

In many cases, service agents 116 may access the help desk service 112 on behalf of users 104-108. In other cases, users 104-108 may access the help desk service 112 to report issues and the service agents 116 may be available to resolve those issues once opened (e.g., via the issue tracking platform). For example, service level agreements (SLA) may be in place between a business and the customer (e.g., an enterprise). Service agents 116 may access an authentication manager 118, which may be the same or different from authentication manager 110. Once authenticated, the service agent 116 may access a different frontend application 116a from the frontend applications 104a-108a described above. Via frontend application 116a, the service agent 116 may access additional information not visible to users 104-108. For example, the service agent 116 may access user profiles 120 to obtain user data, such role of the user, one or more groups of which the user is a member, one or more projects that the user is associated with, identifying information, one or more tickets related to the user, and the like. In some cases, the user profile 120 may include user permission settings, user history, system settings, and other system profile data associated with the backend applications of the service management system 102.

In some embodiments, the service management system 102 may include event log modules 122. The event log modules 122 may track and/or store user actions, system events, or other data generated in accordance with activity performed by the system users. The event log module 122 may include navigation events that are generated in response to user navigation to various pages, documents, user selection of certain issue items, user selection of field items, and the like. For example, the user event log modules 122 may be used to determine recently-used fields in an intake interface builder. As another example, the event log module 122 may also include logged activities from users (e.g., customers) at the help desk service 112, including fields filled out, and the like. In some examples, the event log module 122 may also include fields used and/or filled in by a service agent in the issue tracking platform. In some examples, the event log module 122 may also include fields commonly used by the administrator 126 in the intake interface builder. Details of the various events may be accessed by a field selection service 124 for selecting and sorting fields for displaying in issue intake builder.

A field selection service 124 selects and sorts fields in a issue intake builder. An issue intake builder is a service which allows an administrator 126 to build intake interfaces. The intake interfaces determine the number of fields, type of fields, required fields, and the like, to be displayed to users (e.g., users 104-108 or service agents 116) accessing the help desk service 112 and to users accessing the issue tracking platform 144. More specifically, the field selection service 124 is available to administrators 126 to facilitate building custom intake interfaces.

More specifically, an administrator 126 may access the service management system 102 through a frontend application 126a executing on a client device. The frontend application 126a may be a different application from non-administrator users, such as users 104-108 and service agent 116. For example, the frontend application 126a of the administrator 126 may include the intake interface builder which is supported by the field selection service 124. The frontend application 104a-108a of users 104-108, respectively, may include a more intuitive interface that allows users to quickly report an issue in the help desk service 112. An authentication manager 118, which may be different from authentication manager 110, may retrieve the administrator's 126 user credentials and authenticate the administrator. In some cases, the authentication manager 118 may retrieve different user credentials or employ a higher-security authentication protocol to authenticate the user. For example, the authentication manager 118 may require two-factor authentication.

Once authenticated, the administrator 126 may access an issue intake builder, which instantiates an instance of the field selection service 124. The issue intake builder is part of the service management system 102 interface. The issue intake builder allows administrators to create and edit intake interfaces. In many cases, for each project, new intake interfaces are needed to capture the needs of the project. As described herein, projects may refer to a broad category of portals within the help desk and within the issue tracking platform under which issue intake categories may be organized. For example, a project related to software development for a videogame may have different service requirements from a project related to hardware changes within an enterprise. Accordingly, a first request type may prompt the user to provide details on the version number of the software and a description of the issue. A second request, relating to hardware changes, may prompt the user to provide details on their current hardware and role within the organization. Generally, the issue intake builder allows administrators to determine which fields are visible in a frontend application 104a generated by the help desk service 112 when filling out an issue item for a given project. The request form may also be used to determine what fields (and in what order) are visible in an issue tracking system. The fields visible in the issue tracking system may be the same fields or different fields from the fields presented in the intake interface at the help desk.

As explained above, the service management system 102 may have hundreds, thousands, or hundreds of thousands of fields, depending on the size of the enterprise or the business managing the service management system on behalf of multiple enterprises. These field items may be stored in a database and leveraged by a form builder 128. The form builder 128 may be a service which allows users to configure forms for collecting and organizing data. The forms described herein may be deployed within any platform of the service management system 102.

The field selection service 124 may leverage the user profiles 120, user event logs 122, and existing forms and field elements (e.g., from the form builder 128 or databases associated with the form builder 128) to sort and display suggested fields to the administrator 126. For example, the field selection service 124 may retrieve fields items that the administrator has recently used (e.g., while building a different intake interface), field items that other users associated with the administrator have used, field items associated with particular projects, and so on. The field selection service 124 may select certain field items from the field items retrieved to display to the user and sort the selected field items in accordance with a criteria. In some embodiments, the criteria may take into account recently used items, type of field item, frequency of use, whether the field item is associated with a project where the intake interface is being created, field items frequently used together, and so on.

At the frontend application of the interface creation module, the sorted field items may be displayed in a field region. The field region may include the sorted field items displayed as field elements. Each field element may be selectable. For example, a user may drag or select the field element to be included in a request editing region. The request editing region may include selected field elements that form the intake interface. An administrator may change the order in which the field elements are displayed, the settings of each field, and other display preferences. For example, an administrator may edit whether fields are hidden in the help desk interface when a user opens a ticket. In some cases, hidden fields may be automatically populated by the help desk service 112. As another example, an administrator may elect certain fields to be visible and locked to users filling out a help ticket in the help desk interface. In other embodiments, the administrator may elect which fields are optional and required.

Regardless of the selections in the request editing regions, the field elements displayed in the field region are streamlined such that administrators can find relevant fields faster. In some cases, the field elements may be updated as the administrator selects certain fields and/or as other administrator-input is received. In some cases, the field selection service 124 selects a predetermined number of fields, and, upon an administrator selecting all the fields, the service repopulates the field region with a new set of field elements sorted in accordance with a criteria. In this configuration, a user can scroll through limited options in batches.

Once an administrator finishes selecting fields in the request editing region, an intake interface is created. The intake interface may be available in the help desk and include the fields as configured in the request creator. In some cases, the request creator may also modify what fields are displayed in the issue tracking system and/or in other platforms within the service management system. As another example, the request creator may dictate the workflow that an issue takes when routed through the issue tracking system. For example, an intake interface may include a "PRIORITY" field. Upon selecting the "PRIORITY" field to default to "URGENT," a workflow within the issue tracking platform may change to expedite resolution of the issue item. Workflow details are provided in FIGS. 2A-2B.

These foregoing embodiments depicted in FIG. 2A-7 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 2A:
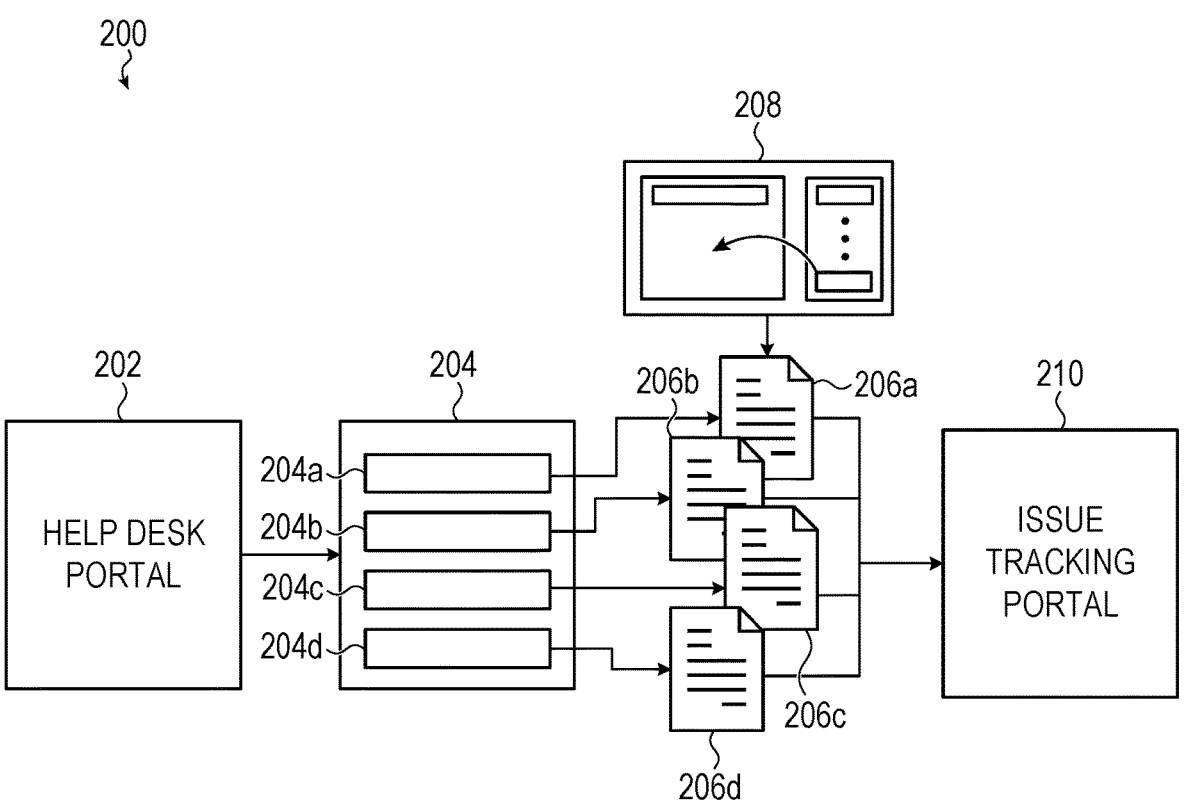
FIG. 2A depicts a workflow of a service management system configured to select and sort fields, such as described herein.
Figure 2B:
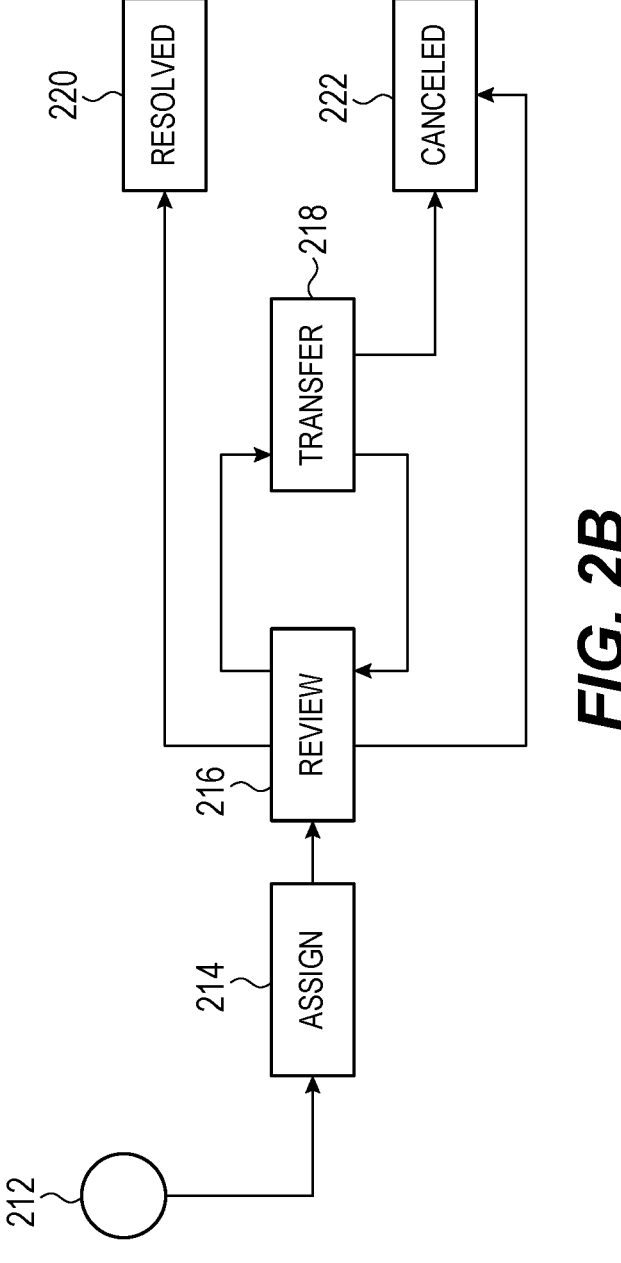
FIG. 2B depicts a workflow of an issue item existing in a service management system, such as described herein.
Figure 3A:
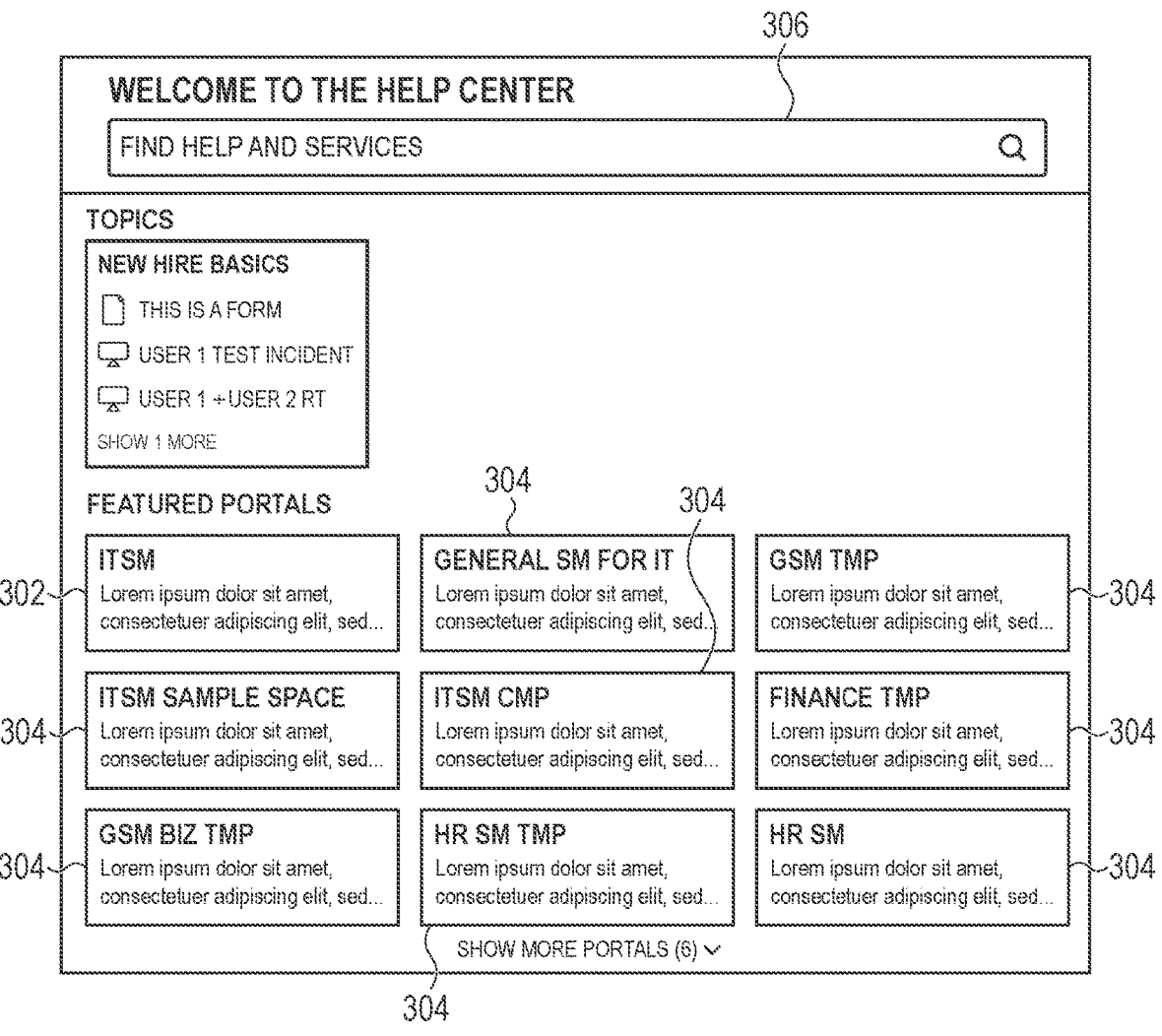
FIGS. 3A-3C depict an example graphical user interface of a help desk portal in a service management system, such as described herein.
Figure 3B:
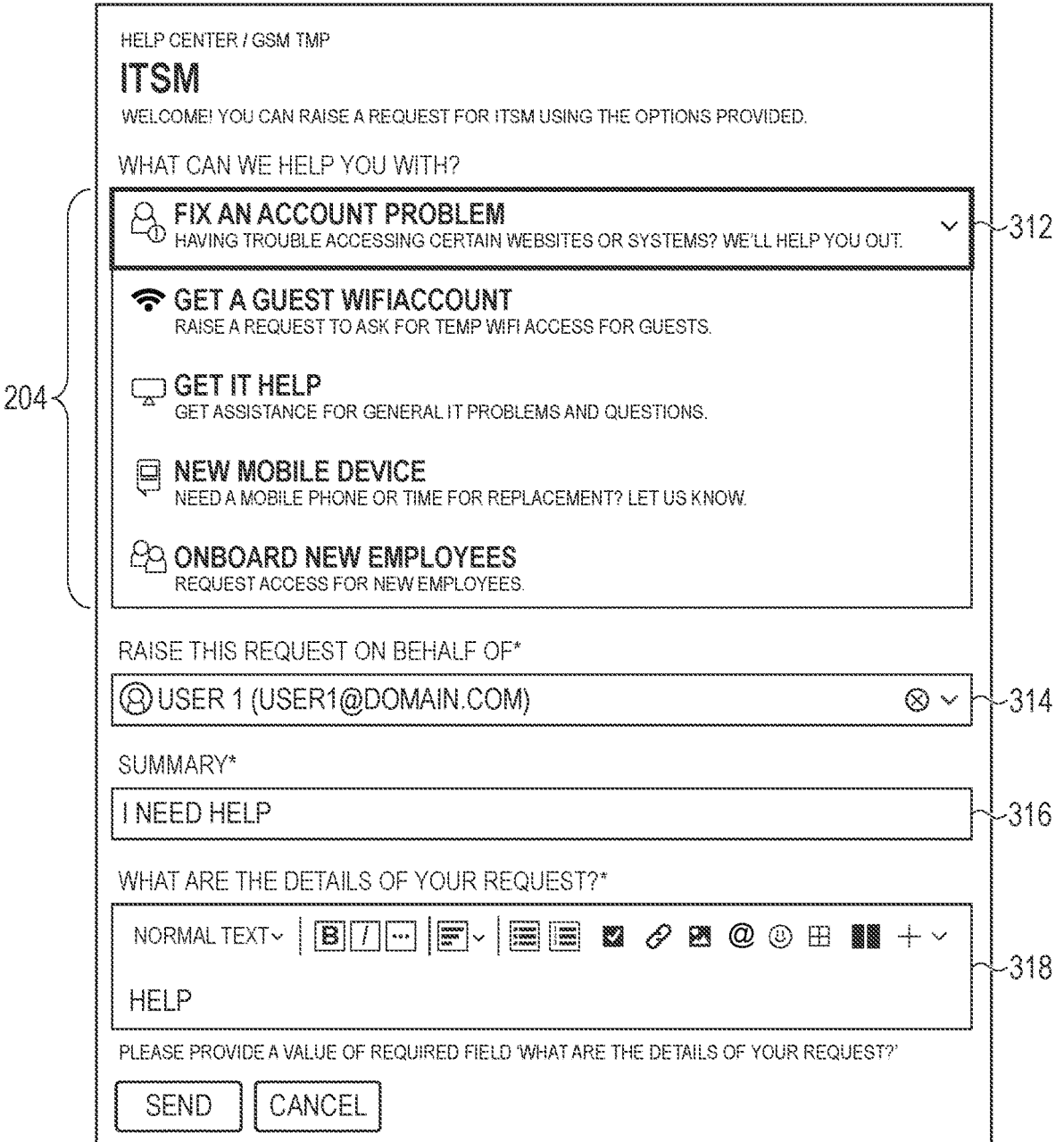
Figure 3C:
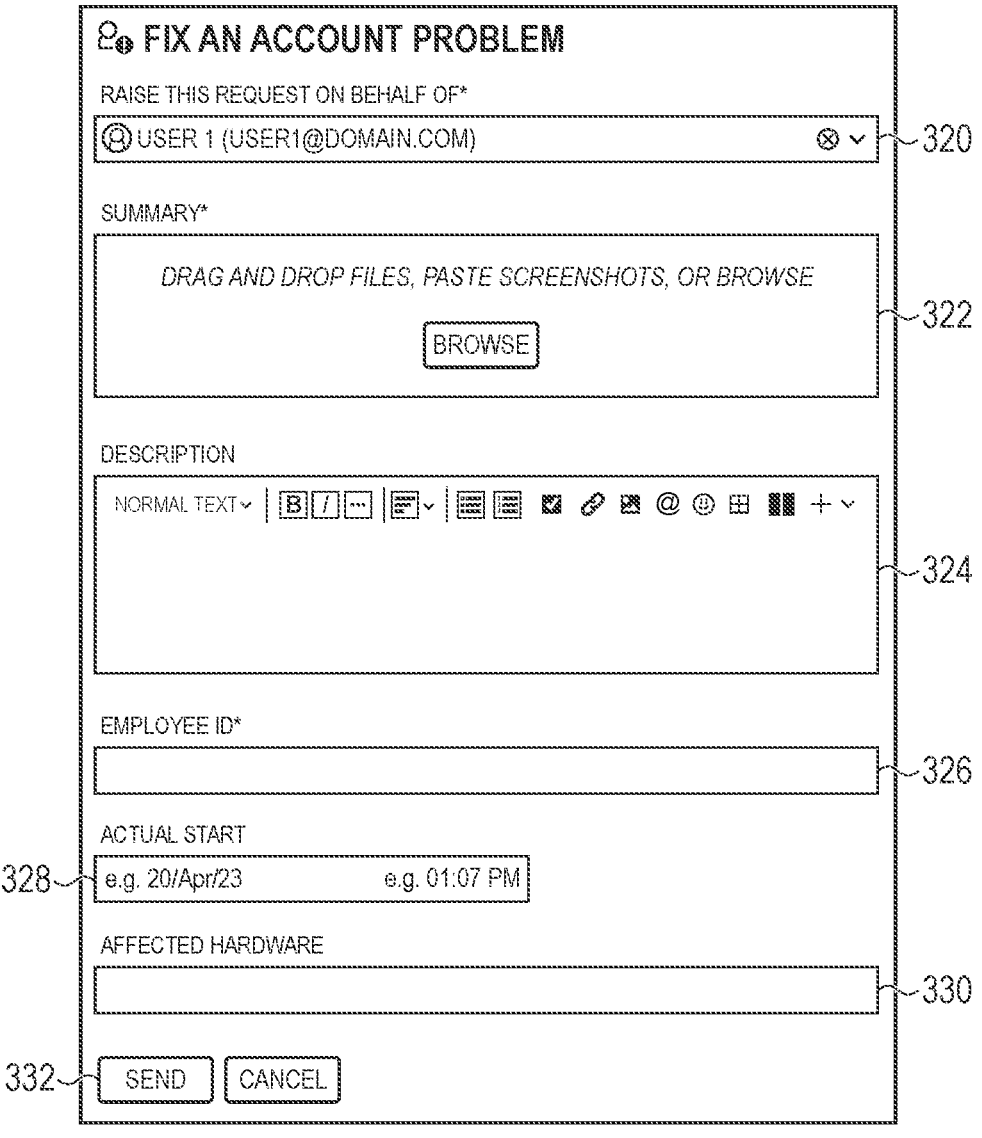

FIG. 2A shows an example workflow 200 for a user reporting an issue. Following authentication, a user (e.g., a service agent or a customer) may access the help desk portal 202. An example graphical user interface is presented in FIGS. 3A-3C. As shown in FIG. 3A, a home page of the help desk portal 202 may include sub-portals, which are defined by a series of interfaces defined in accordance with a project or intake category. Selecting an intake category may cause the portal to route a user to different features of the help desk. For example, the help desk portal 202 may include an ITSM 302 where a user may seek IT-related assistance. Similarly, the help desk may include portals 304 for different departments of an enterprise, including human resources, finances, and so on. The help desk portal 202 may also include a search bar 306 to facilitate finding of information, such as documents relating to a knowledge base.

Upon selecting a sub-portal, such as the ITSM portal 302, an interface for raising an issue is presented, as shown in FIG. 3B. The interface may include multiple input items that corresponds to fields, such as a request type field 312, a requestor field 314, a summary field 316, and a description field 318. Upon selecting the request type field 312, the user may be presented with a menu of intake categories. This menu of intake categories may correspond with the menu 204 of FIG. 2A. As shown in FIGS. 2A and 3B, the menu of intake categories allows users to select a request that best fits their needs. For example, "FIX AN ACCOUNT PROBLEM," "GET A GUEST WIFI ACCOUNT," "GET IT HELP," "NEW MOBILE DEVICE," and "ONBOARD NEW EMPLOYEES" may each correspond to different requests. Each of these requests may correspond to intake interfaces 204a-d in FIG. 2A.

Upon selection of an intake interface (e.g., 204a, b, c, or d), a backend application may retrieve a form 206a-d that corresponds to the intake interface. Each of these forms may be created by an administrator via a request creator form interface 208. In some embodiments, each form is unique to the intake interface and includes input items that correspond to field elements from the request item builder and which is tailored to the user's issue category. An example form (e.g., 206a) is presented in FIG. 3C.

As shown in FIG. 3C, the form is tailored to relevant information relating to a "FIX AN ACCOUNT PROBLEM" issue. For example, the form may include a user field 320, a summary field 322, a description field 324, a department number field 326, an actual start 328, and an affected hardware field 330. As shown in the figure, certain fields may be required, such as the summary field 322, the user field 320, and the department number field 326. As explained above, each of these fields may be tailored to the particular problem.

Once a user (e.g., a customer user, a service agent) fills out and submits the form (e.g., via "SEND" button 332), the service management system may transmit the data to an issue tracking system, which generates an issue item based on the data from the form. As shown in FIG. 2A, a service agent may have access to an issue tracking portal 210, which may be a graphical user interface of the issue tracking system (e.g., Issue Tracking Platform 114). At the issue tracking portal, a user may view the data input into the form from the help desk, view the status of the ticket, view/edit other information, and the like. An example issue tracking portal interface is presented in FIG. 4.

Figure 4:
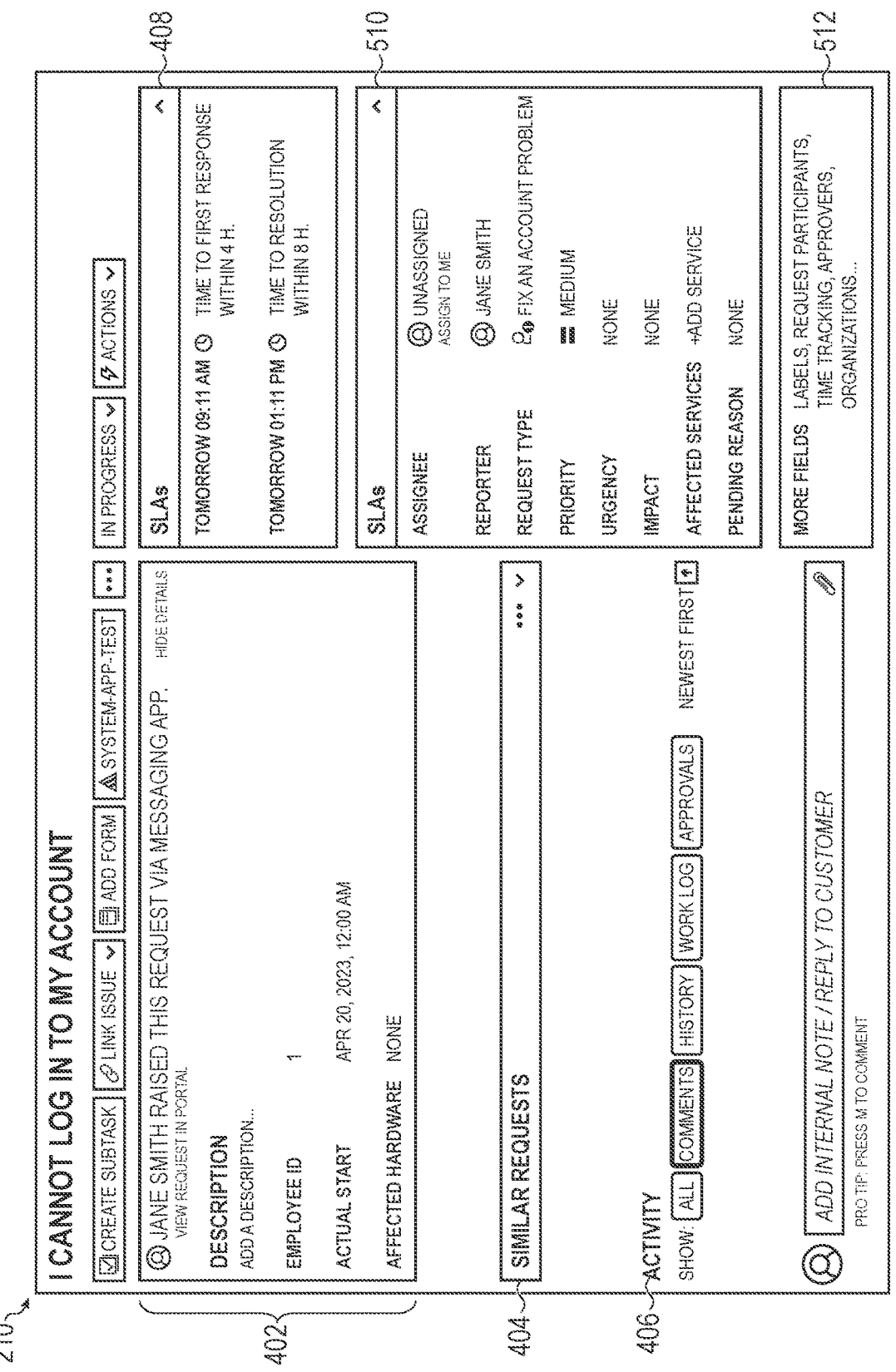
FIG. 4 depicts an example graphical user interface of an issue tracking platform in a service management system, such as described herein.

As shown in FIG. 4, the issue tracking portal 210 may display an issue item and relevant tracking information. For example, the data input in the form 206a may be displayed in a first display area 402. In some cases, users (e.g., agents, administrators) may edit these fields as more information is received. In some cases, the intake interfaces may include hidden fields. These hidden fields may be displayed to users in the first display area 402.

The issue tracking portal 210 may also gather other data (e.g., from user event logs or databases coupled to the issue tracking system), including similar requests 404 and activity 406. In many cases, enterprises use a service-level agreement (SLA), which specifies the process, timelines, and metrics by which services, such as IT, are provided. The issue tracking system may include issue item metric regions, such as regions 408 and 410, which may track metrics according to the SLA. For example, upon generating an issue item, the issue tracking system may automatically set a time for reply and completion that may correspond to the SLA. Similarly, region 410 may include editable field items that may be used to resolve the issue. For example, an issue item may be assigned to particular service agents, the urgency of the request may be set, and the like. The issue tracking portal 210 may also include other fields 412 which may be used by service agents to track metrics, add labels, track time, and the like.

The issue tracking platform may process each of the issues or tickets in accordance with a workflow or series of predefined states that the issue must traverse in order to be resolved by the issue tracking platform. An example workflow from the time an issue time is created is presented in FIG. 2B. In some embodiments, at the intake interface builder interface, a workflow can be defined contemporaneously with the intake interface and with the issue item view in an issue tracking platform. When an issue is created 212, a workflow for resolving the issue is generated (e.g., via a backend application of the service management portal, such as the issue tracking system). As a first step, the issue may be assigned 214 to a service agent or other users. In some embodiments, the request type and/or other fields from the intake interface may determine the assigning step. For example, a group of users may be assigned to particular intake categories. As another example, a group of users may be assigned to a project where the particular request type can be used. As yet another example, a particular data input to a field (e.g., "AFFECTED HARDWARE") may determine a user or a group of users to be assigned to the issue.

Once an issue item is assigned, the user or group of users assigned to the item may review 216 the issue. On review of the issue, the assigned users may resolve 220 the issue or may transfer 218 the issue, as an example. Upon transferring 218, updated assignees may review 216 the issue again to ensure proper routing of the issue item. In some cases, the issue may be canceled 222 or it may be linked to another issue for a combined resolution. In some cases, depending on the complexity and/or the type of request, the workflow may include additional steps or less steps. More generally, the request type may dictate the number of steps and workflow used for each of the issue items. Accordingly, building an intake interface may determine the fields displayed in the help desk, the fields visible in the issue tracking system, and the workflow associated with the issue item.

Figure 5A:
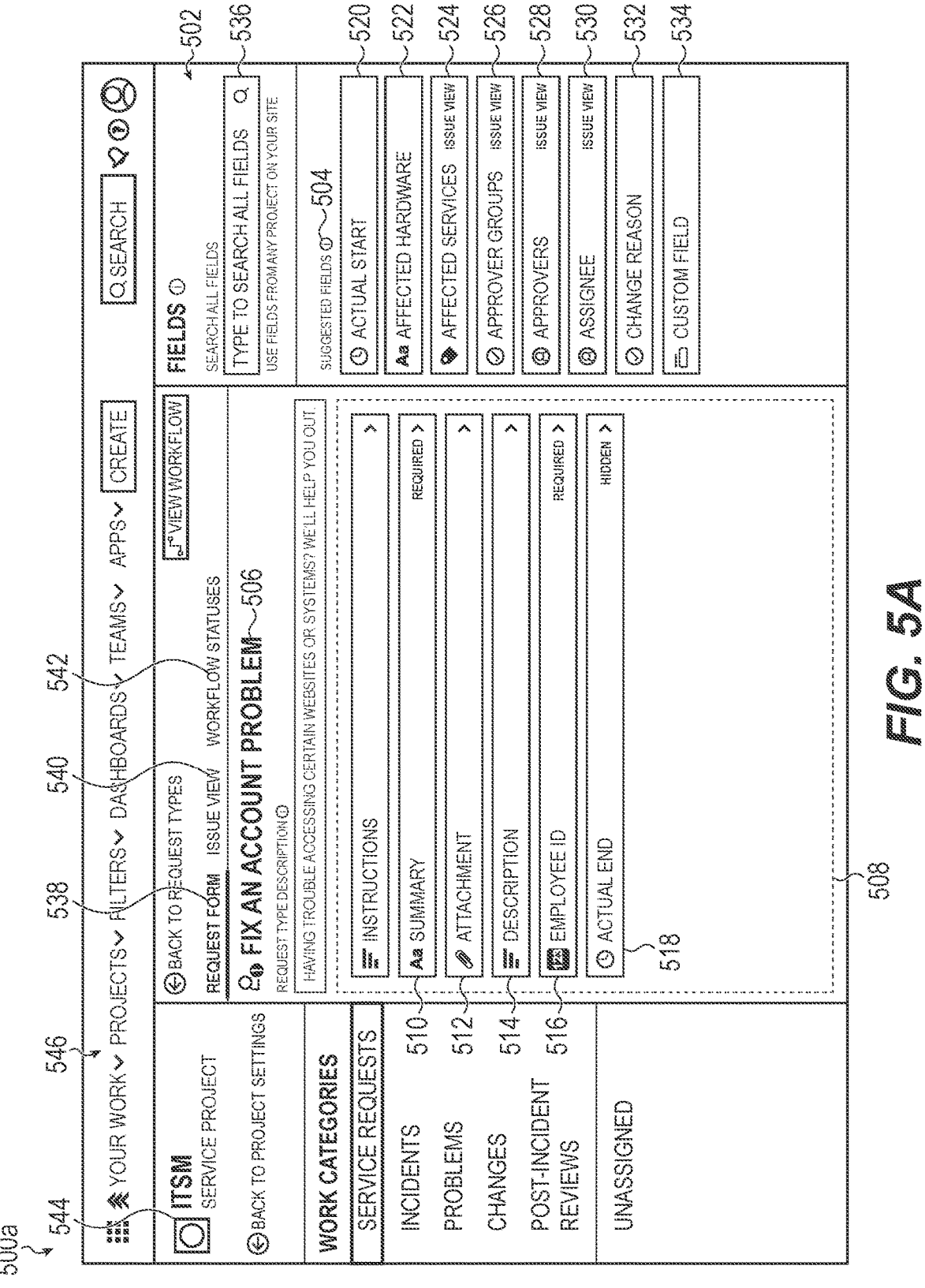
FIGS. 5A-5E depict an example graphical user interface of an intake interface builder in a service management system, such as described herein.

A sample issue intake builder is presented in FIG. 5A. As described above, the issue intake builder allows administrators to quickly build forms for use in the help desk. These forms may be associated with particular projects, categories, and the like. The graphical user interface 500a of the issue intake builder includes a field region 502 that displays field suggestions 504 which are tailored to each authenticated user account having administrator or similar permissions. While the graphical user interface 500a is described as an independent graphical user interface, it may be part of the issue tracking system (e.g., Issue Tracking Platform 114), part of the help desk (e.g., help desk service 112), or part of other platforms that are part of the service management system (e.g., service management system 102).

To display field suggestions 504, a backend application may retrieve user event logs, user profiles, forms, and the like, from the service management system. These data items may include fields, data relating to recently-used fields, data relating to recently-created fields, and/or data relating to fields frequently used by the administrator or other users. The data items may also include the administrator's profile including assigned projects, and the like. The retrieved data items may be used to select fields predicted to be relevant to the administrator and sort them in accordance to a criteria.

In some cases, the selection criteria may be based on recently used fields by the administrator. For example, a backend application may retrieve the fields used with a predetermined time period and sort those fields in accordance with a time-related criteria. In this configuration, fields that are more relevant to a particular project can be easily found and each request type may be built in a more streamlined manner.

In another example, the criteria may be based on a usage criteria of the administrator and users related to the administrator in a common project. In this example, the backend application may leverage user event logs from users, such as other administrators or service agents, associated with the administrator configuring the intake interface. The association may be based on common projects, common departments, previous interactions, and the like. Based on the field use of the administrator and the users associated with the administrator, the service may select fields commonly or recently used by the administrators and other users with the common project. In this example, the selected fields to be displayed may be further sorted by fields recently used by the administrator followed by fields recently used by other users. As another example, the service may aggregate a usage frequency of the selected fields and display the fields according to a higher-use incidence criteria.

In some cases, the field elements are suggested based on the actual use of input items corresponding to fields in the intake interface, in the help desk, and in the issue tracking system (e.g., once the issue is created). For example, a backend application may aggregate a frequency under which a particular field is used by users in the help desk for each of the intake interface forms and the issue items in the service management system for existing issue items. Based on the frequency usage (e.g., field having values other than null), these fields may be suggested as field elements to the administrator user in the intake interface builder. In some cases, the use history may be used to find issues that were created under a similar or the same project type. An analysis on those fields that are non-zero or not null may be performed. For example, the analysis may be based on a histogram or other count of fields that are in use. Once the number of use times satisfies a criteria, the field to the suggested field elements in the field region.

In some cases, the intake interface form may include a feedback element which allows users to provide feedback on whether a particular field is helpful to the particular project and/or intake category. Similarly, at the issue tracking platform, the service agents may provide field-specific or issue-specific feedback on whether the fields presented are helpful to resolve the issue and/or whether additional fields are suggested based on the service agent's experience. In some cases, based on the feedback, the intake interface builder may include the helpful fields provided by the user and/or service agent feedback or may suppress fields relating to negative feedback from the users and service agents.

As another example, the service may perform a semantic analysis based on administrator input to display and update fields. For example, upon an administrator entering a title 506 for the intake interface, a backend application may perform a semantic analysis to determine similar intake interfaces having semantically-similar titles or fields. Field items may then be extracted from the identified forms and displayed in the field region 502. In some cases, the field items displayed may be further sorted by recently used, alphabetically, field type, or other criteria including a second similarity criteria.

According to some embodiments, the backend application may query the project to obtain project data, such as project type. Based on the project data, the service may select field items associated with the project within which the intake interface is being created and/or edited. For example, a project which is related to hardware upgrades may include a current hardware field, office location field, a department field, and the like. A new project related to a different hardware upgrade may query previous hardware upgrade projects and/or requests to obtain field items. The field region may then be updated to display the obtained field items.

In other variations, the field selection service may take into account already-selected fields to suggest additional fields. For example, in a request editing region 508, an administrator may select fields, such as fields 510, 512, 514, 516, and 518. Based on the selected fields 510, 512, 514, 516, and 518, an application may retrieve a set of fields related to the selected fields. For example, an intake interface that includes an attachment field 512 and an employee ID field 516 may typically be related with hardware issues or service issues that the employee (e.g., the customer) is having. Accordingly, a backend application may retrieve fields related to one or more of the selected fields and display related fields in accordance with a relatedness criteria. In this example, the "AFFECTED HARDWARE" field 522 and the "AFFECTED SERVICES" field 524 may be displayed in the field region 502 because "AFFECTED HARDWARE" meets a relatedness metric with respect to fields 512 and 516.

In some examples, once a set of fields are selected, the set of fields may be displayed according to different groupings, categories, and/or subsets. In some cases, the subset of fields may be displayed according to the field type. For example, the "ACTUAL START" field 520 has a date picker type, the "AFFECTED HARDWARE" field 522 has a text type, the "AFFECTED SERVICES" field 524 has a tag type, the "APPROVERS" and "ASSIGNEE" fields 528 and 530 may have a user type, and so on. The fields may be grouped based on the field types. Accordingly, an administrator may quickly review and select fields from each of the field types without duplicating similar fields in the request editing region.

As shown in FIG. 5A, the field region 502 may include a search bar 536. Generally, the search bar 536 may further help an administrator find field elements. In some embodiments, user input in the search bar 536 causes a database query (e.g., coupled to the form builder), which retrieves field elements based on a simple search. In other variations, a user input may cause a backend application to retrieve field elements based on a semantic similarity search. In other examples, the user input may retrieve a first field based on a simple or semantic similarity search and retrieve additional fields related to or generally used with the searched fields.

For example, a backend application may generate cluster maps, classifications, or related group of items which are retrieved together when a particular field is searched.

A issue intake builder graphical user interface 500a further allows an administrator to quickly build an intake interface for the help desk, generate an issue item view in the Issue Tracking Platform, and generate a workflow of the intake interface with the Issue Tracking Platform and in the service management system in general. As an example, the issue intake builder graphical user interface 500a may include different tabs that allows the user to toggle to the different views described above. For example, the "REQUEST FORM" tab 538 causes display of the issue intake builder interface, such as the one shown in FIG. 5A, which generates an intake interface that is available in the help desk. Similarly, the "ISSUE VIEW" tab 540 causes display of an issue view interface where the administrator can edit which fields are visible, hidden, and the like, once an issue item has been created. The "WORKFLOW STA-TUSES" tab 542 may allow users to view and edit work-flows of the issue item. Thus, in a single interface, request and issue forms can be generated and edited alongside each other, which further streamlines project set-up in a service management system.

In some cases, the suggested fields in the field region 502 may include field elements which are included in other tabs of the same intake interface family. In this configuration, each field element included in another tab may have a graphical indicator to indicating where the field element has been selected. For example, field elements 526, 528, 530, and 532 include an "ISSUE VIEW" graphical indicator within the field graphical element. This indicates that fields 526, 528, 530, and 532 have been selected in the ISSUE VIEW tab 540.

As discussed above, each intake interface may be gener-ated as part of a project. The graphical user interface 500a may include a workspace for each of the project. In some examples, a project 544 may be indicated as part of a navigational space of the graphical user interface 500a. In some examples, the request graphical user interface 500a may be part of a general interface of the service management system. In some cases, the graphical user interface 500a may also include a top panel 546 which allows users to navigate to other platforms and/or interfaces.

Figure 5B:
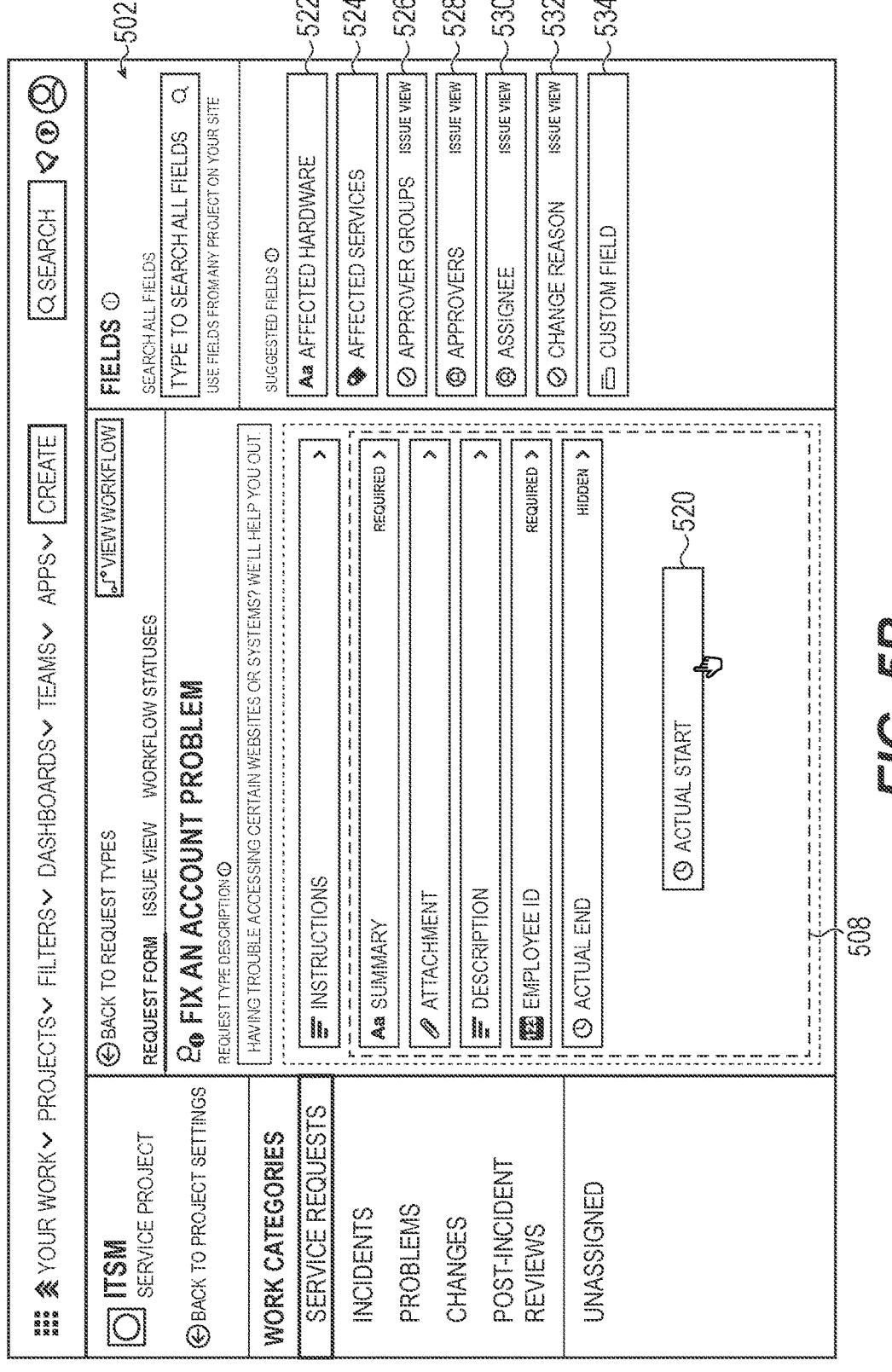

FIG. 5B depicts an example graphical user interface 500a showing a drag and drop feature of the field elements. As depicted, a user may drag field elements, such as field element 520, from a field region 502 to a request editing region 508. As the user drags field element 520, the user may select the location (e.g. order with respect to other selected field elements) in which the field element is placed. When the field element 520 is outside of the field region 502, the remaining field elements may move up in the list, and the field element 520 is removed from selectable in the field region. In some cases, additional field elements may not be populated as a result from the selection. Instead, in some examples, additional field elements are populated when the user has otherwise selected all suggested fields 522-534.

While a drag and drop feature is depicted, users may click on the field element in the field region to place the field element with the request editing region 508. In other embodiments, the field elements in the field region 502 may include selectable checkboxes or other selection feature, which allows a user to quickly transition the field elements from the field region 502 to the request editing region.

In some cases, different field elements may be function differently based on the type and/or a particular function of the field element. For example, "CUSTOM FIELD" 534 may look the same as the other field elements; however, upon selecting the custom field 534 to the request editing region 508, the graphical user interface may automatically display a custom field creation window. The custom field creation window may allow a user to quickly create a new field, including adding a field title, type, and other data to create the field. Upon a user confirming the creation of the new field, the graphical user interface within the request editing region 508 may be updated to show the newly-created field item and associated attributes. The custom field 534 may continue to be displayed in the field region 502, despite a dragging input that launched the custom field creation window. As a result of this configuration, the user can create multiple custom fields with the same selection or dragging motion as other field elements.

Figure 5C:
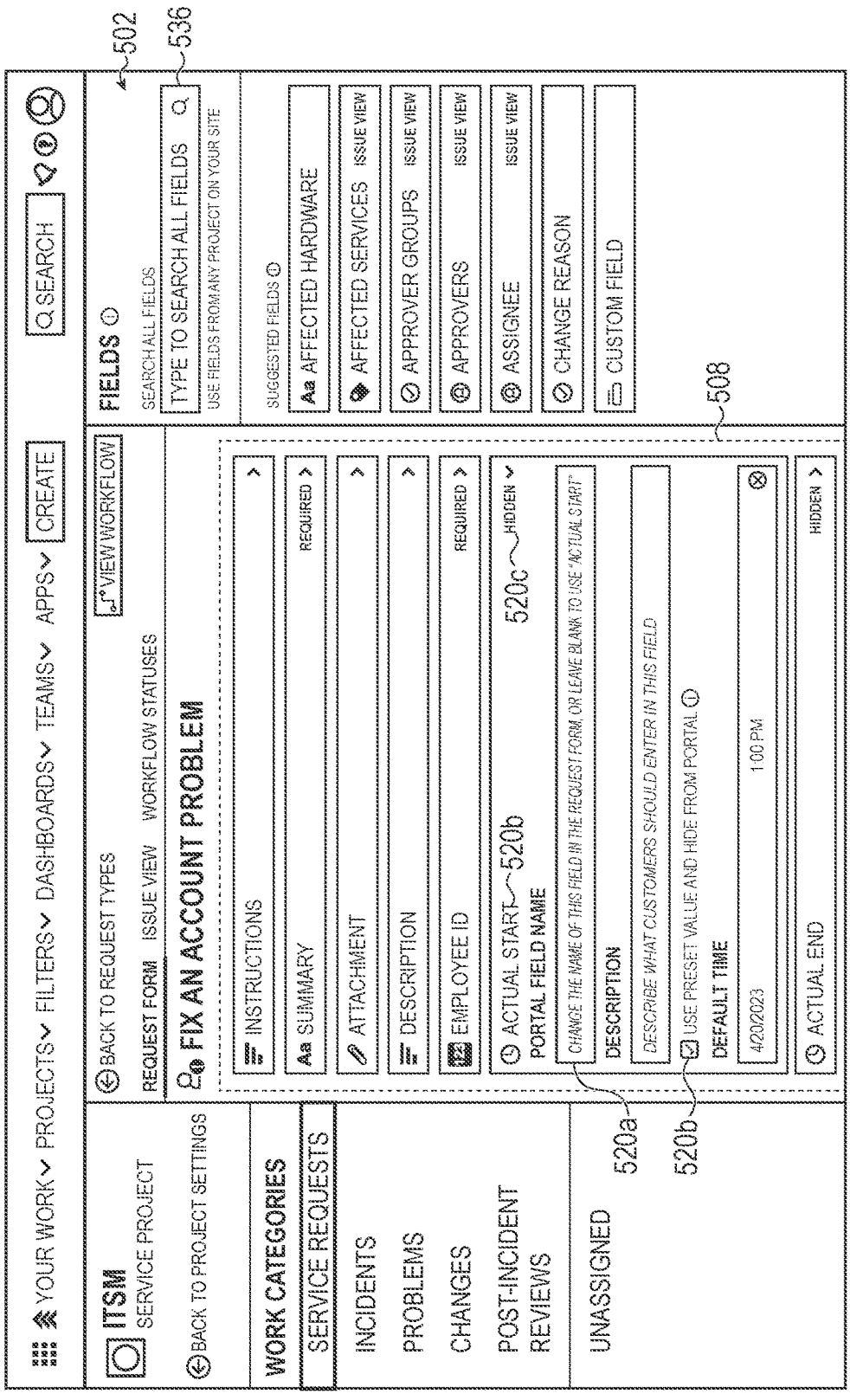

FIG. 5C depicts an example graphical user interface 500a that shows different graphical elements available to a user once a field element has been selected from the field region 502 and moved into the request editing region 508. As depicted, once field element 520 is in the request editing region, a user may expand menu options for the field element. For example, a user may change the displayed name of the field via text input 520a. In some cases, changing the name of the field in the portal does not change the name of the field. Thus, in this configuration, the same field element may be used along different projects, intake categories, and the like. In other embodiments, changing the portal field name via text input 520a causes a backend application to store the portal field name. Thus, an admin-istrator using a search via search bar 536 may search for the portal field name and, in response to the query, a field corresponding to the portal field name previously used may be returned.

Once a field element has been selected within the request editing field, a user may also choose different constraints on the field. For example, a user may choose whether the field element will be hidden, shown, required, optional, and the like within the help desk. For example, checkbox 520b allows a user to elect if the field is hidden 520c. Upon selecting the checkbox to hide a field, the user may have the option to use a preset value. In this configuration, while additional fields are populated, a customer or a service agent sees a simplified form that allows the customer or service agent to quickly open an issue item.

Figure 5D:
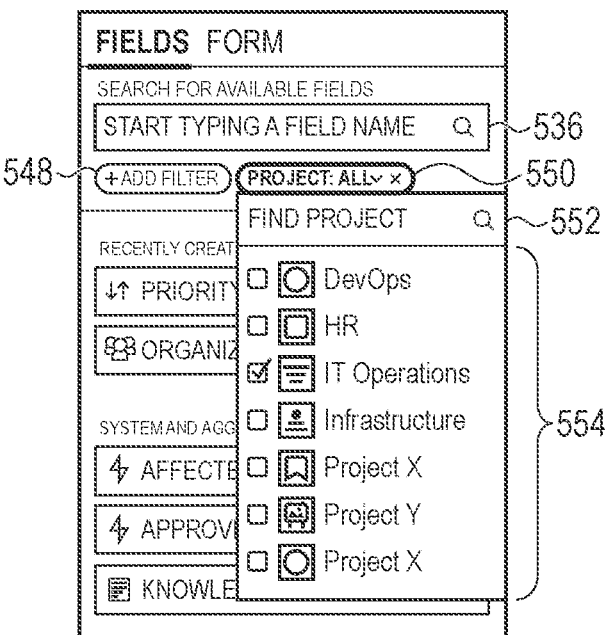

FIG. 5D shows a detail view of an example field region graphical user interface 502a. As explained above, a user may search for field elements within the field region via a search bar 536. In some examples, the field region 502a may include additional filters that the user may apply to further narrow the displayed field elements (e.g., further narrow the suggested fields sorted according to a criteria, as described above). The user may select the "ADD FILTER" graphical element 548 to create a customized filter or to leverage existing filters. For example, existing filters may include a field type, fields already in issue view, fields created by the user, and the like. Example customized filter may include a date range (e.g., fields created within a particular period), fields related to a particular keyword, and/or other field parameters including portal field name.

In some examples, the field region 502a may include a particular filter for projects. As discussed above (e.g., FIG. 3A), a project may refer to each of the different portals under which the intake categories (e.g., created by the intake interface builder) are organized. In other words, a project may be hierarchically higher than the different intake cat-egories. For example, a user searching under a human resources project may find different intake categories related to benefits, paychecks, and the like.

Back to FIG. 5D, the user may select the "PROJECT" filter graphical element 550 to view suggested fields within a particular project. Upon selecting the "PROJECT" filter graphical element 552, a drop down menu 554 may be displayed showing different project options. The project options shown may be suggested projects selected by a backend application using a project selection criteria. For example, the criteria may be based on recently browsed projects, projects to which the user is assigned to, frequently selected projects by a subset of users associated with the administrator, and the like. In some examples, the project filter may include a project search bar 552 to search for projects.

Figure 5E:
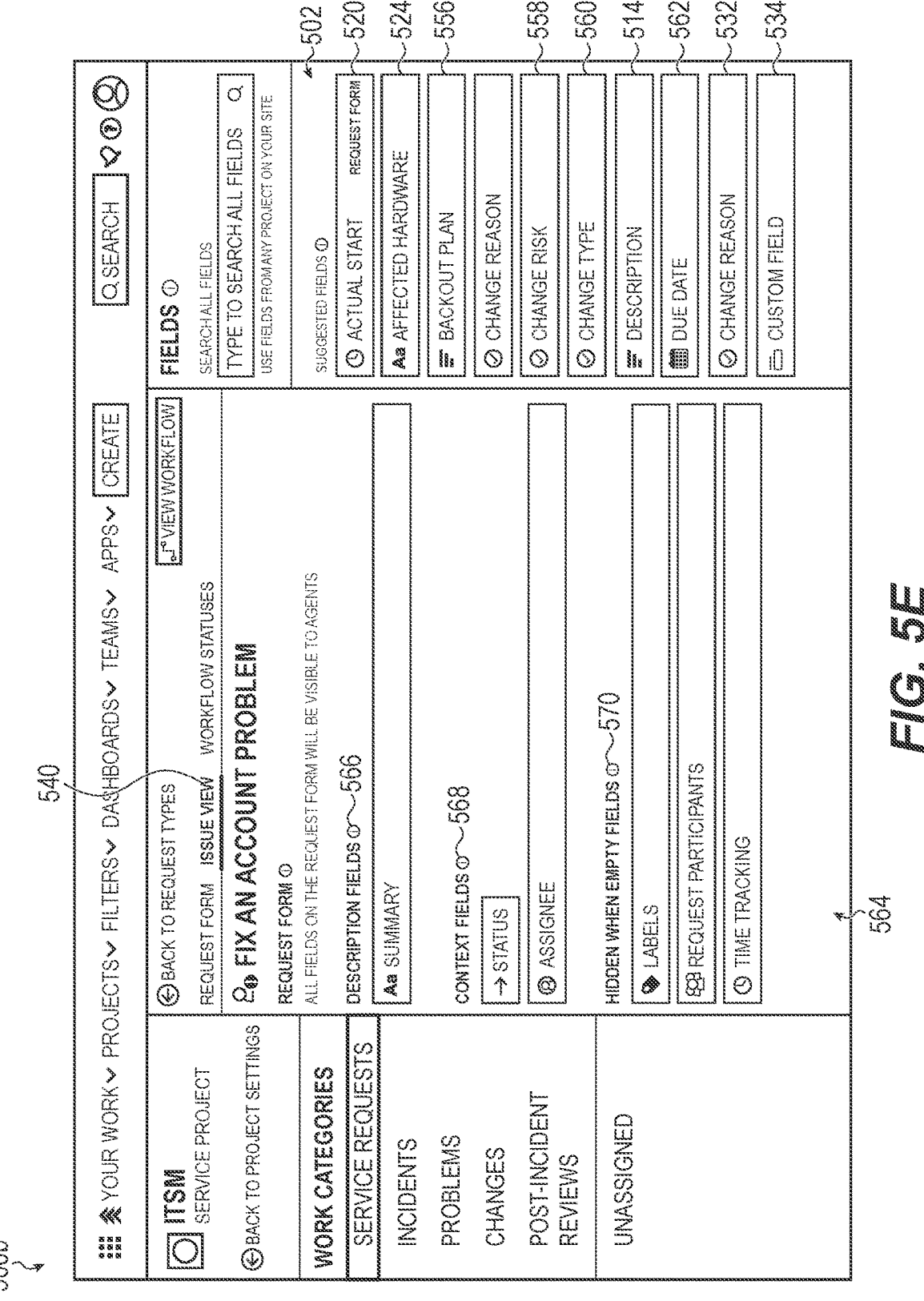

FIG. 5E shows an example graphical user interface 500b of the issue view interface. A user may select the "ISSUE VIEW" tab 540 to scroll to the issue view interface. Similar to the issue intake builder, the issue view interface includes a field region 502. At the field region 502 of the issue view interface, the field elements (e.g., 556, 558, 560, 562) shown may be different from the field elements suggested in the issue intake builder. In some embodiments, the criteria applied to select and sort field elements may be different from the criteria applied to select and sort field elements in the issue intake builder. In other embodiments, the criteria applied to select and sort field elements may be the same as the criteria applied in the issue intake builder. In some examples, the field elements shown in field region 502 may include field elements of the selected fields within request editing region 508 (e.g., FIGS. 5A-5C). As an example, the "ACTUAL START" field 520, the "AFFECTED HARD-WARE" field 524, and the "DESCRIPTION" field 514 may display a "REQUEST FORM" graphical indicator to signal to the user that those fields are shown in the help desk interface of the intake interface.

The issue view interface may include an issue editing region 564. At the issue editing region 564, a user may place field elements in different portions to further organize the issue view. For example, the user may place field elements in a "DESCRIPTION FIELDS" portion 566. In some cases, the "DESCRIPTION FIELDS" portion may be a primary view of the issue element. In some examples, the user may place field elements under the "CONTEXT FIELDS" portion 568, "HIDDEN WHEN EMPTY FIELDS" portion 570, and so on. In this configuration, users, such as administrators and service agents, can view different data for an issue item than customers. These fields may allow administrators and service agents to more quickly resolve an issue without overwhelming a user with fields that may not be relevant to the customer.

FIG. 6 shows an example method 600 of sorting the field elements in the request editing region. At step 602, an administrator may be authenticated. As explained above, the administrator may be authenticated using a different authentication criteria from customers and/or service agents. The authentication of the administrator allows access to different portals and/or graphical user interfaces, including the intake interface builder.

At step 604, the intake interface builder may be displayed. As explained above, the intake interface builder may include a field region where field elements are displayed and a request editing region that receives field elements. The field elements received in the request editing region may correspond to input items in an issue intake interface in a help desk.

At step 606, a first set of field elements are selected based on prior user event history. As described above, the user event history may be based on use of particular field items by the administrator in the issue intake interface, actual use of fields in the help desk (e.g., by users that are customers), actual use of fields in the issue tracking platform (e.g., by the administrator, by service agents), and the like.

At step 608, a second set of field elements are selected per a selection criteria. The selection criteria may be based on a recent use basis, a frequency basis, project-based, semantic similarity-based, related to other field items, and/or other criteria or combination of criteria.

At step 610, the selected second set of field elements is displayed within the field region in the intake interface builder.

At step 612, a field element is received in the request editing region. In some cases, a user may drag and drop the field element from one region to the next. The user may pick and format the field elements in the request editing region. Once a user confirms, the issue intake interface corresponding to the field elements in the request editing region is generated.

FIG. 7 shows a sample electrical block diagram of an electronic device 700 that may perform the operations described herein. The electronic device 700 may in some cases take the form of any electronic device, including client devices, and/or servers, or other computing devices associated with the system 100 from FIG. 1. The electronic device 700 can include one or more of a processing unit 702, a memory 704 or storage device, input devices 706, a display 708, output devices 710, and a power source 712. In some cases, various implementations of the electronic device 700 may lack some or all of these components and/or include additional or alternative components.

The processing unit 702 can control some or all of the operations of the electronic device 700. The processing unit 702 can communicate, either directly or indirectly, with some or all of the components of the electronic device 700. For example, a system bus or other communication mechanism 714 can provide communication between the processing unit 702, the power source 712, the memory 704, the input device(s) 706, and the output device(s) 710.

The processing unit 702 can be implemented as any electronic device capable of processing, receiving, or transmitting data or instructions. For example, the processing unit 702 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 700 can be controlled by multiple processing units. For example, select components of the electronic device 700 (e.g., an input device 706) may be controlled by a first processing unit, and other components of the electronic device 700 (e.g., the display 708) may be controlled by a second processing unit, where the first and second processing units may or may not be in communication with each other.

The power source 712 can be implemented with any device capable of providing energy to the electronic device 700. For example, the power source 712 may be one or more batteries or rechargeable batteries. Additionally, or alternatively, the power source 712 can be a power connector or power cord that connects the electronic device 700 to another power source, such as a wall outlet.

The memory 704 can store electronic data that can be used by the electronic device 700. For example, the memory 704 can store electronic data or content such as, for instance, audio and video files, documents and applications, device settings and user preferences, timing signals, control signals, and data structures or databases. The memory 704 can be configured as any type of memory. By way of example only, the memory 704 can be implemented as random access memory, read-only memory, Flash memory, removable memory, other types of storage elements, or combinations of such devices.

In various embodiments, the display 708 provides a graphical output, for example, associated with an operating system, user interface, and/or applications of the electronic device 700 (e.g., a chat user interface, an issue-tracking user interface, an issue-discovery user interface, etc.). In one embodiment, the display 708 includes one or more sensors and is configured as a touch-sensitive (e.g., single-touch, multi-touch) and/or force-sensitive display to receive inputs from a user. For example, the display 708 may be integrated with a touch sensor (e.g., a capacitive touch sensor) and/or a force sensor to provide a touch- and/or force-sensitive display. The display 708 is operably coupled to the processing unit 702 of the electronic device 700.

The display 708 can be implemented with any suitable technology, including, but not limited to, liquid crystal display (LCD) technology, light emitting diode (LED) technology, organic light-emitting display (OLED) technology, organic electroluminescence (OEL) technology, or another type of display technology. In some cases, the display 708 is positioned beneath and viewable through a cover that forms at least a portion of an enclosure of the electronic device 700.

In various embodiments, the input devices 706 may include any suitable components for detecting inputs. Examples of input devices 706 include light sensors, temperature sensors, audio sensors (e.g., microphones), optical or visual sensors (e.g., cameras, visible light sensors, or invisible light sensors), proximity sensors, touch sensors, force sensors, mechanical devices (e.g., crowns, switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 706 may be configured to detect one or more types of input and provide a signal (e.g., an input signal) corresponding to the detected input. The signal may be provided, for example, to the processing unit 702.

As discussed above, in some cases, the input device(s) 706 include a touch sensor (e.g., a capacitive touch sensor) integrated with the display 708 to provide a touch-sensitive display. Similarly, in some cases, the input device(s) 706 include a force sensor (e.g., a capacitive force sensor) integrated with the display 708 to provide a force-sensitive display.

The output devices 710 may include any suitable components for providing outputs. Examples of output devices 710 include light emitters, audio output devices (e.g., speakers), visual output devices (e.g., lights or displays), tactile output devices (e.g., haptic output devices), communication devices (e.g., wired or wireless communication devices), and so on, or some combination thereof. Each output device

710 may be configured to receive one or more signals (e.g., an output signal provided by the processing unit 702) and provide an output corresponding to the signal.

In some cases, input devices 706 and output devices 710 are implemented together as a single device. For example, an input/output device or port can transmit electronic signals via a communications network, such as a wireless and/or wired network connection. Examples of wireless and wired network connections include, but are not limited to, cellular, Wi-Fi, Bluetooth, IR, and Ethernet connections.

The processing unit 702 may be operably coupled to the input devices 706 and the output devices 710. The processing unit 702 may be adapted to exchange signals with the input devices 706 and the output devices 710. For example, the processing unit 702 may receive an input signal from an input device 706 that corresponds to an input detected by the input device 706. The processing unit 702 may interpret the received input signal to determine whether to provide and/or change one or more outputs in response to the input signal. The processing unit 702 may then send an output signal to one or more of the output devices 710 to provide and/or change outputs as appropriate.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes, at a minimum, one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

The foregoing examples and description of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database. Whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference an implementation in which discrete functions of the system are implemented as discrete microservices. It is appreciated that this is merely one possible implementation.

It may be further appreciated that a request-response RESTful system implemented in whole or in part over cloud infrastructure is merely one example architecture of a system as described herein. More broadly, a system as described herein can include a frontend and a backend configured to communicably couple and to cooperate in order to execute one or more operations or functions as described herein. In particular, a frontend may be an instance of software executing by cooperation of a processor and memory of a client device. Similarly, a backend may be an instance of software and/or a collection of instantiated software services (e.g., microservices) each executing by cooperation of a processor resource and memory resources allocated to each respective software service or software instance. Backend software instances can be configured to expose one or more endpoints that frontend software instances can be configured to leverage to exchange structured data with the backend instances. The backend instances can be instantiated over first-party or third-party infrastructure, which can include one or more physical processors and physical memory devices. The physical resources can cooperate to abstract one or more virtual processing and/or memory resources that in turn can be used to instantiate the backend instances.

The backend and the frontend software instances can communicate over any suitable communication protocol or set of protocols to exchange structured data. The frontend can, in some cases, include a graphical user interface rendered on a display of a client device, such as a laptop computer, desktop computer, or personal phone. In some cases, the frontend may be a browser application and the graphical user interface may be rendered by a browser engine thereof in response to receiving HTML served from the backend instance or a microservice thereof.

What is claimed is:

1. A method for automatically selecting and sorting fields in a service management system, the method comprising:

determining that an authenticated user account has administrator access with respect to the service management system;

subsequent to determining that the authenticated user account has administrator access with respect to the service management system, causing display of an intake interface builder graphical user interface, the intake interface builder graphical user interface comprising concurrent display of:

a field region configured to display a plurality of field elements; and a request editing region configured to receive text input, and field elements from the field region in response to a drag-and-drop user input, the request editing region defining user input regions of an issue intake interface of a help desk platform;

selecting, by the service management system, a first set of field elements of a plurality of field items based on a first selection criteria based on prior user event history associated with the respective field element with respect to the service management system;

subsequent to the selection of the first set of field elements, selecting, by the service management system, from the first set of field elements, a first subset of field elements satisfying a second selection criteria different than that first selection criteria and based on, at least in part, field element selections performed by the authenticated user account within a predetermined time period;

the intake interface builder graphical user interface, receiving text input associated with a title;

in response to receiving, the text input, performing a semantic similarity analysis based at least on a comparison between a portion of the text input and a set of existing intake interfaces;

selecting a second set of field elements from semantically similar existing intake interfaces from the set of existing intake interfaces satisfying a similarity threshold; and at the intake interface builder graphical user interface:

causing display, in the field region, of:

the first subset of field elements;

the second set of field elements, each field element of the second set of field elements sorted according to a similarity metric; and receiving a first user input corresponding to selection of a first field element of the first subset of field elements;

in response to receiving the first user input, displaying the first field element within the request editing region and suppressing display of the first field element within the field region;

receiving a second user input confirming creation of the issue intake interface; and in response to receiving the second user input, generating the issue intake interface including an input field corresponding to the first field element when displayed by the help desk platform.

2. The method of claim 1, wherein the user account is a first user account and further comprising:

determining that an authenticated second user account has customer access with respect to the service management system;

subsequent to determining that the authenticated second user account has customer access with respect to the service management system, causing display of the issue intake interface, receiving, at the issue intake interface, a customer input to create a new issue item;

in response to receiving the customer input to create the new issue item:

causing display of a first window having a form comprising an intake interface input field;

receiving a user selection of the issue intake interface from the intake interface input field; and in response to the user selection of the issue intake interface from the intake interface input field, retrieving a set of user input fields including the input field corresponding to the first field element and automatically configuring the input field in accordance to a format; and receiving a second customer input to at least one user input field of the set of user input fields; and in accordance with receiving the second customer input to the at least one user input field of the set of user input fields, generating an issue item at an issue tracking system.

3. The method of claim 1, wherein:

the user account is a first user account;

the prior user event history is a first prior user event history associated with the first user account;

selecting the first set of field elements of a plurality of field items is further based on a second prior user event history associated with a set of second user accounts with respect to the service management system; and further comprising:

computing a frequency of use for the first set of field elements used by the first user account and by the set of second user accounts; and in response to computing the frequency of use, select the first subset of field elements in accordance with the selection criteria, the selection criteria further comprising the first subset of field elements sorted in accordance to the computed frequency of use of each respective field element.

4. The method of claim 1, further comprising:

detecting at least one field element positioned within the request editing region;

querying a backend application to obtain a group of intake interface forms that include the at least one field element;

extracting a first related field element related to the at least one field element from the issue intake interface forms that is associated with the at least one field element; and cause display, within the field region, of the first related field element.

5. The method of claim 1, wherein the selection criteria further comprises selecting a second subset of field elements from the first subset of field elements based on a project of the service management system where the issue intake interface is being created.

6. The method of claim 1, wherein the selection criteria comprises sorting field elements in accordance with most recent use by the user account.

\* \* \* \* \*